(12) United States Patent
Alvarez

(10) Patent No.: US 11,692,439 B2
(45) Date of Patent: Jul. 4, 2023

(54) SYSTEMS AND METHODS FOR ESTIMATING PORE PRESSURE AT SOURCE ROCKS

(71) Applicant: Saudi Arabian Oil Company, Dhahran (SA)

(72) Inventor: Angelica Maria Rios Alvarez, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 86 days.

(21) Appl. No.: 17/344,015

(22) Filed: Jun. 10, 2021

(65) Prior Publication Data

US 2022/0397034 A1      Dec. 15, 2022

(51) Int. Cl.
| | |
|---|---|
| *E21B 49/00* | (2006.01) |
| *E21B 21/06* | (2006.01) |
| *G01V 1/30* | (2006.01) |
| *E21B 47/04* | (2012.01) |

(52) U.S. Cl.
CPC ............ *E21B 49/00* (2013.01); *E21B 21/062* (2013.01); *G01V 1/303* (2013.01); *G01V 1/306* (2013.01); *E21B 47/04* (2013.01); *E21B 2200/20* (2020.05)

(58) Field of Classification Search
CPC ........ E21B 49/00; E21B 21/062; E21B 47/04; E21B 2200/20; G01V 1/303; G01V 1/306
See application file for complete search history.

(56) References Cited

U.S. PATENT DOCUMENTS

| | | | | |
|---|---|---|---|---|
| 4,833,914 A | * | 5/1989 | Rasmus | ................... E21B 47/06 73/152.52 |
| 4,981,037 A | * | 1/1991 | Holbrook | ................ E21B 21/08 73/152.05 |
| 6,609,067 B2 | * | 8/2003 | Tare | ........................ E21B 21/08 702/9 |
| 7,782,709 B2 | | 8/2010 | Esmersoy | |
| 8,274,399 B2 | | 9/2012 | Strachan et al. | |

(Continued)

FOREIGN PATENT DOCUMENTS

CN         112034521 A        12/2020

OTHER PUBLICATIONS

Pore Pressure Estimation from velocity data: Accounting for overpressure mechanisms besides undercompaction Glenn L. Bowers; SPE Drilling & Completion, Jun. 1995; pp. 89-95.

(Continued)

*Primary Examiner* — Abby J Flynn
*Assistant Examiner* — Yanick A Akaragwe
(74) *Attorney, Agent, or Firm* — Dinsmore & Shohl LLP

(57) ABSTRACT

Systems and methods to estimate a pore pressure of source rock include a pore pressure estimation processor, an executable, or both, and are operable to (i) calculate an estimate pore pressure based on overburden gradient data, a compaction velocity profile, hydrocarbon maturity, and an unloading velocity profile, (ii) determine a total organic content (TOC) estimate of the source rock based on a bulk density at a vertical depth measured using the density logging tool, (iii) determine a correction factor based on (a) the TOC estimate and (b) vitrinite ratio $R_o$ data, and (iv) update the estimated pore pressure in real-time based on the correction factor.

19 Claims, 9 Drawing Sheets

(56) References Cited

U.S. PATENT DOCUMENTS

2007/0285274 A1* 12/2007 Esmersoy ............... G01V 1/42
340/853.7
2022/0229201 A1* 7/2022 Boudjatit ............... G01V 1/50

OTHER PUBLICATIONS

Determining an appropriate Pore-Pressure estimation strategy; Glenn L. Bowers; OTC-13042; May 2001.

Formation overpressure and shale oil enrichment in the shale system of Lucaogou Formation, Malang Sag, Santanghu Basin, NW China; Liu,Bo, LU Yanfang, Zhao Rong, Tu Xiaoxian, Guo Xiaobo, Shen Ying; Petroleum Exploration and Development, vol. 39, Issue 6, Dec. 2012.

Pore pressure prediction in Unconvention Resources; B.A. Couzens-Schultz, A. Axon, k. Azbel, K.S. Hnsen, M. Haugland, R. Sarker, B. Tichelaar, J.B. Wieseneck, R. Wilhelm, J. Zhang, Z. Zhang; IPTC-16849; Mar. 2013.

Modeling Pore Pressure Evolution in Organic Shale under the effect of Maturation; Xuan Qin, De-hua Han, Luanxiao Zhao; SEG International Exposition and 88th Annual Meeting; pp. 3602-3607, 2018.

Overpressure generation and evolution in Lower Paleozoic gas shales of the Jiaoshiba region, China: Implications for shale gas accumulation; Jian Gao, Jian-kun Zhang; Sheng He, Jian-xin Zhao, Zhi-liang He, Yu-jin Wo, Yue-xing Feng, Wen Li; Marine and Petroleum Geology 102 (2019) 844-859.

Effects of early petroleum charge and overpressure on reservoir porosity preservation in the giant Kela-2 gas field, Kuqa depression, Tarim Basin, Northwest China; Xiaowen Gua, Keyu Liu, Chengzao jia, Yan Song, Mengjun Zhao and Xuesong Lu; AAPG Bulletin, vol. 100, No. 2 (Feb. 2016), pp. 191-212.

Overpressure Generation Mechanisms and Its Distribution in the Paleocene Shahejie Formation in the Linnan Sag, Huimin Depression, Eastern China; Li Chao.

Pore Pressure Prediction in the Point Pleasant Formation in the Appalachian Basin, in parts of Ohio, Pennsylvania, and West Virginia, United States of America; Bennett Trotter.

Evidence for overpressure generation by kerogen-to-gas maturation in the northern Malay Basin; Mark R.P. Tingay.

* cited by examiner

SYSTEMS AND METHODS FOR ESTIMATING PORE PRESSURE AT SOURCE ROCKS

TECHNICAL FIELD

The present disclosure relates to pore pressure estimation and, in particular, to systems and methods for estimating pore pressure in a well bore using a correction factor computed based on total organic content and hydrocarbon maturity.

BACKGROUND

Pore pressure may be estimated using data such as mud weights, repeat formation tests, extended leak-off tests, seismic velocities, and well log data. Such methods may not adequately capture pore pressure associated with hydrocarbon generation. Hydrocarbon generation may be a source of overpressure and is related to the kerogen maturation process in a source rock being examined.

Accordingly, a need exists for an alternative method for pore pressure estimation to adequately and accurately account for hydrocarbon generation.

BRIEF SUMMARY

According to the subject matter of the present disclosure, a system comprises a density logging tool, a model module comprising a regional model for a region of source rock and a source rock model for source rock of a well bore, and a pore pressure estimation processor. The density logging tool is configured to measure a bulk density of the source rock at a vertical depth. The regional model of the model module comprises regional data associated with the region of the source rock, the regional data comprising overburden gradient data defining overburden stress of the source rock in the region, a compaction velocity profile of the source rock in the region as a function of effective stress, and an unloading velocity profile of the source rock as a function of effective stress including pore overpressure and hydrocarbon maturity. The source rock model of the model module comprises vitrinite ratio $R_o$ data for the source rock defining hydrocarbon maturity in the source rock. The pore pressure estimation processor is communicably coupled to the density logging tool, and the model module, and is operable to (i) calculate an estimate pore pressure based on the overburden gradient data, the compaction velocity profile, the hydrocarbon maturity, and the unloading velocity profile, (ii) determine a total organic content (TOC) estimate of the source rock based on the bulk density at the vertical depth using the density logging tool, (iii) determine a correction factor based on (a) the TOC estimate and (b) the vitrinite ratio $R_o$ data, and (iv) update the estimated pore pressure in real-time based on the correction factor.

In accordance with one embodiment of the present disclosure, a system comprises a density logging tool, a model module comprising a regional model for a region of source rock and a source rock model for source rock of a well bore, and a pore pressure estimation processor. The density logging tool is disposed in the well bore and is configured to measure a bulk density of the source rock at a vertical depth. The regional model of the model module comprises regional data associated with the region of the source rock. The regional data comprises overburden gradient data defining overburden stress of the source rock in the region. The regional data comprises a compaction velocity profile of the source rock in the region as a function of effective stress. The regional data comprises an unloading velocity profile of the source rock as a function of effective stress including pore overpressure and hydrocarbon maturity. The source rock model of the model module comprises vitrinite ratio $R_o$ data for the source rock defining hydrocarbon maturity in the source rock. The pore pressure estimation processor is communicably coupled to the density logging tool, and the model module, and is operable to (i) calculate an estimated pore pressure based on the overburden gradient data, the compaction velocity profile, the hydrocarbon maturity and the unloading velocity profile, (ii) determine a total organic content (TOC) estimate of the source rock based on the bulk density at the vertical depth using the density logging tool, (iii) determine a correction factor based on (a) the TOC estimate and (b) the vitrinite ratio $R_o$ data, and (iv) update the estimated pore pressure in real-time based on the correction factor such that the correction factor is added to the estimated pore pressure calculated based on the overburden gradient data, the compaction velocity profile, the hydrocarbon maturity, and the unloading velocity profile.

In accordance with another embodiment of the present disclosure, a method comprises calculating, via a pore pressure estimation processor, an estimated pore pressure based on regional data of a regional model for a region of source rock of a well bore, the regional data of the regional model comprising overburden gradient data defining overburden stress of the source rock in the region, a compaction velocity profile of the source rock in the region as a function of effective stress, and an unloading velocity profile of the source rock as a function of effective stress and hydrocarbon maturity. The method also comprises determining a total organic content (TOC) estimate of the source rock based on a bulk density at a vertical depth, wherein the density at the vertical depth is estimated using a density logging tool that is configured to estimate the density at a vertical depth. The method also comprises determining a correction factor based on (i) the TOC estimate and (ii) the vitrinite ratio $R_o$ data. The method also comprises updating, via the pore pressure estimation processor, the estimated pore pressure in real-time based on the correction.

Additional features and advantages of the systems and methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

While certain existing pore pressure estimation methods, such as the method disclosed by Glenn L. Bowers in "Pore Pressure Estimation From Velocity Data: Accounting for Overpressure Mechanisms Besides Under Compaction," J. Rock Mechanics and Mining Science & Geomechanics, June 1995 (herein referred to as "Bower's Method"), take into account certain overpressure mechanisms such as fluid expansion, such methods fail to adequately account for hydrocarbon generation that is present in source rock being examined. As a result, pore pressure may be underestimated by methods such as Bower's Method.

In embodiments described herein, systems and methods are disclosed for estimating pore pressure of source rock by correcting an estimated pore pressure using a correction factor that is based on total organic content (TOC) and hydrocarbon maturity of source rock. The correction factor may be based on (i) a TOC estimate of the source rock that is determined based on a density estimated using a density logging tool; and (ii) vitrinite ratio $R_o$ data associated with a particular location (e.g., a vertical depth) of the source rock to define hydrocarbon maturity in the source rock. The above-described Bower's Method, while accounting for disequilibrium compaction and certain fluid expansion mechanisms in estimating pore pressure, underestimates pore pressure for certain forms of source rock (e.g., a Jurassic calcareous mudstone source rock) by failing to take hydrocarbon generation and maturity into account. The embodiments herein incorporate hydrocarbon maturity via selection of an unloading velocity profile and a correction factor, as described herein, As a result, pore pressure estimates generated using the systems and methods described herein provide a more accurate representation than Bower's Method of actual pore pressures in source rock through which well bores are being drilled, which allows for better configuration of mud weights and lowers the probability of unexpected well control events.

As used herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor including a processor circuit that executes machine-readable instructions; a memory including a memory circuit that stores machine-readable instructions executed by the processor circuit; other suitable hardware components that provide the described functionality; or a combination of some or all of the above.

Figure 1A:
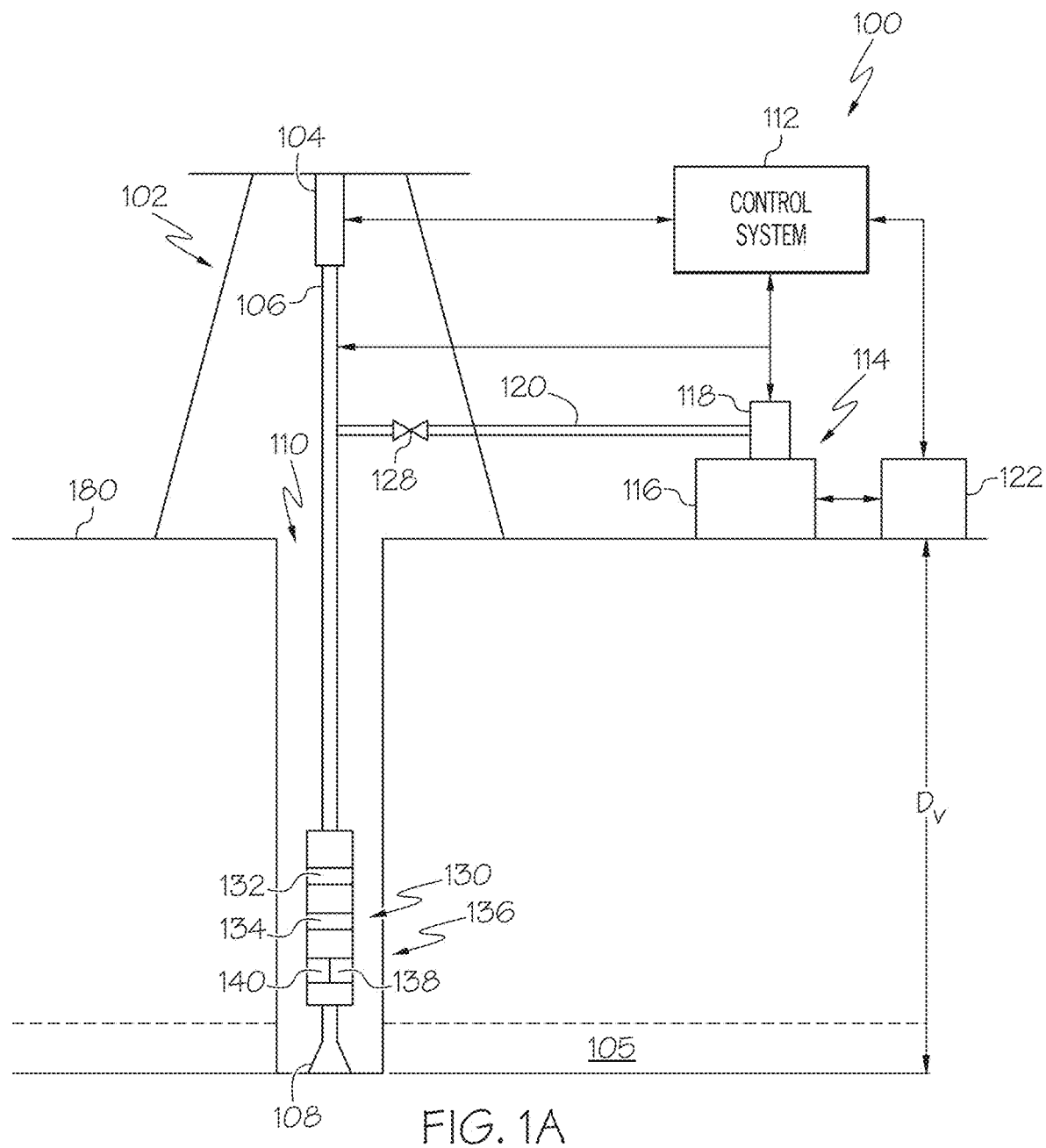
FIG. 1A schematically depicts a drilling system to carve into source rock for a well bore, according to one or more embodiments shown and described herein.

Referring now to FIG. 1A, an embodiment of a drilling system 100 includes a drill rig 102 extending over a well bore 110 in and defined by source rock 105. While the drill rig 102 is depicted as a land-based rig, it should be understood that other rig types such as water-based rigs are contemplated and within the scope of the present disclosure. The drilling system 100 includes a drill string 106 extending from a support 104 into the well bore 110. The drilling system 100 further includes a drill bit 108 disposed at an end of the drill string 106. The drill bit 108 is configured to drill the well bore 110 beneath a surface 180 to reach source rock 105. In embodiments, the drill string 106 is mechanically coupled to the drill bit 108 and communicably coupled to a control system 112. The control system 112 may generate control signals to control rotation of the drill string 106 to cause the drill bit 108 to drill the well bore 110 beneath the surface 180.

Figure 1B:
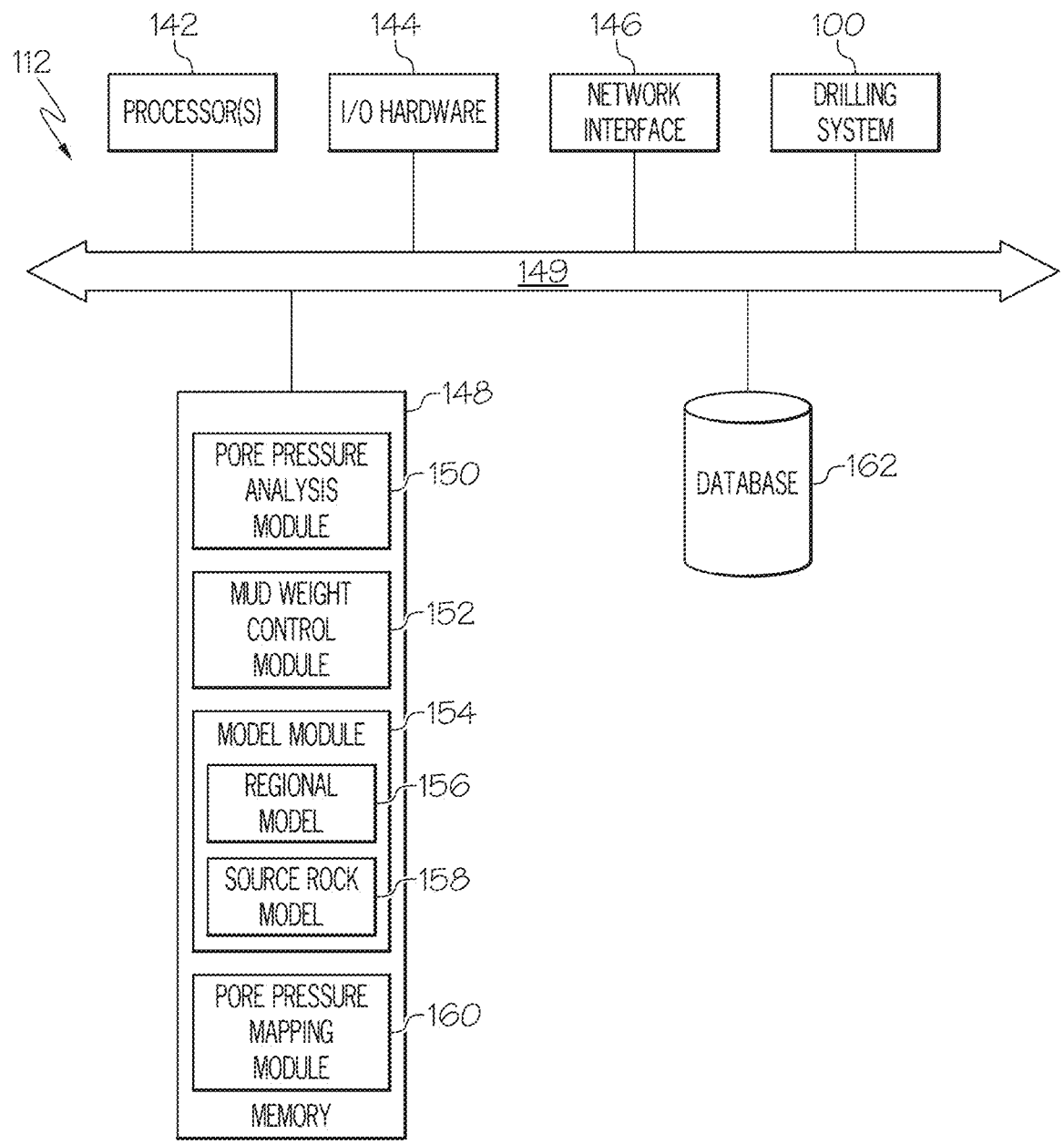
FIG. 1B schematically depicts a control system of the drilling system of FIG. 1A, according to one or more embodiments described herein.

Various components of the control system 112 are described in greater detail herein with respect to FIG. 1B. It should be appreciated that the drilling system 100 is only an example and that the pore pressure estimation methods described herein are applicable in a wide variety of contexts and may be implemented in a wide variety of systems. For example, in embodiments, a system implementing the pore pressure estimation methods described herein may not include the drill string 106 and drill bit 108. The pore pressure estimation methods described herein may be performed via an instrumentation assembly (not depicted) inserted into a pre-drilled well bore 110. Moreover, alternative drilling systems than the drilling system 100 depicted in FIG. 1A may be used in performing the pore pressure estimation methods described herein.

The drilling system 100 of FIG. 1A further includes a mud weight system 114 that is fluidly coupled to the drill string 106 and configured to deliver a drilling mud having a mud weight into the well bore 110. In embodiments, the mud weight system 114 includes a drilling mud source 116 (e.g., a drilling mud reservoir or storage tank) and a pump system 118 in fluid communication with the drilling mud source 116. In embodiments, the pump system 118 is configured to pressurize the drilling mud from the drilling mud source 116 and deliver pressurized drilling mud to the drill string 106 via a drilling mud conduit 120. In embodiments, a fluid regulator 128 (e.g., a valve or other suitable flow regulator) is disposed between the mud weight system 114 and the drill string 106 and configured to regulate a flow rate of the drilling mud into the drill string 106. The drilling mud may travel within the drill string 106 and into the well bore 110 via openings in the drill bit 108. In embodiments, the drilling mud travels to a surface 180 of the source rock 105 via the well bore 110.

The mud weight system 114 beneficially aids to prevent or reduce an amount of pressurized fluid within pores of the source rock 105 from entering the well bore 110 and reaching the surface 180. Such events may be dangerous to personnel and cause damage to various components of the drilling system 100. Accordingly, in embodiments, a mud weight of the drilling mud may be determined based on an estimated pore pressure of fluid within the source rock 105. The mud weight of the drilling mud may be adjusted via a mud weight additive system 122. The mud weight of the drilling mud may vary depending on a concentration of a mud weight additive introduced into the drilling mud via the mud weight additive system 122. In embodiments, the mud weight additive includes barite or other suitable salt that is mixed into the drilling mud in the drilling mud source 116 via a suitable mixing method. The mud weight additive system 122 may include a mixing hopper or other suitable mixing device that is controlled by the control system 112 to introduce an amount of a mud weight additive into the drilling mud prior to the drilling mud being introduced into the well bore 110. The control system 112 may control an outlet of the mud weight additive system 122 (e.g. open or close an opening an outlet) to regulate an amount of the mud weight additive that is introduced into the drilling mud source 116.

In embodiments, as described herein, the mud weight of the drilling mud introduced into the well bore 110 via the mud weight system 114 is related to an estimated pore pressure of fluid within the source rock 105 at a vertical depth $D_v$ of the well bore 110. The mud weight may vary in accordance with a predetermined relationship with an estimated pore pressure at the vertical depth $D_v$. The predetermined relationship may be that mud weight greater than or equal to the estimated pore pressure is sufficient to prevent fluids within the source rock 105 from entering the well bore 110.

In embodiments, such as when the well bore 110 is being drilled, the mud weight may be less than the estimated pore pressure at the vertical depth $D_v$ by at most a predetermined amount. That is, in such scenarios, an underbalance, where the mud weight is less than the estimated pore pressure, may be used. The extent of the underbalance (e.g., the magnitude by which the mud weight is less than the estimated pore pressure) may vary depending on the vertical depth $D_v$. When drilling with such an underbalance, if a region of relatively high pore pressure within the source rock 105 is encountered, fluid within the source rock 105 may cause a pressure spike within the well bore 110, potentially causing damage to the drilling system 100. Accordingly, the pore pressure at the vertical depth $D_v$ may be estimated and the mud weight may be adjusted based on the pore pressure such that a desired relationship between the mud weight and pore pressure is maintained. More details with regard to the desired relationship between the mud weight and pore pressure will be provided in greater detail further below with respect to FIG. 3.

The drilling system 100 further includes a well logging tool 130 disposed in the well bore 110. The well logging tool 130 includes sensing instrumentation that measures properties of the source rock 105 proximate to the well bore 110 to facilitate real-time pore pressure estimation and control of the mud weight system 114 to provide a mud weight to counterbalance the pore pressure of the source rock 105. In embodiments, the vertical depth $D_v$ at which the pore pressure of the source rock 105 is estimated via the density logging tool 136 corresponds to the end of the drill string 106 at which the drill bit 108 is disposed. An entirety of the well logging tool 130 may be disposed on the drill string 106 within the well bore 110. The well logging tool 130 may be communicably coupled (e.g., via a wired connection or a suitable wireless communications protocol) to the control system 112 via the drill string 106 (e.g., a wiring system may extend through the drill string 106). It should be understood that the depicted configuration is only an example and that other configurations for the well logging tool 130 are contemplated and within the scope of the present disclosure. For example, in embodiments, one or more of the components of the well logging tool 130 (e.g., the acoustic transmitter 132 or the acoustic receiver 134) may be disposed on the surface 180. Various sub-combinations of the components of the well logging tool 130 (e.g., the density logging tool 136, the acoustic transmitter 132, the acoustic receiver 134) may be incorporated into separate assemblies and disposed at different depths within the well bore 110 on the drill string 106. Embodiments are also envisioned where at least a portion of the control system 112 is disposed within the well bore 110 (e.g., as a component of the well logging tool 130).

Referring still to FIG. 1A, the well logging tool 130 includes a density logging tool 136 that is configured to measure a bulk density of the source rock 105 at the vertical depth $D_v$. In embodiments, the well logging tool 130 includes a gamma ray source 138 transmitting gamma rays into the source rock 105 (e.g., at an interior wall of the well bore 110) and a detector 140 configured to generate a density detection signal from a portion of the gamma rays that are scattered by the source rock 105. The density detection signal generated via the detector 140 may be provided to the control system 112 to estimate a total organic content (TOC) of the source rock 105 at the vertical depth $D_v$. As described herein, the estimated TOC of the source rock 105 may be used to compute a correction factor taking hydrocarbon maturity into account, which correction factor is used to update a pore pressure estimated without hydrocarbon maturity such as through, for example, Bower's Method.

The well logging tool 130 also includes an acoustic transmitter 132 and an acoustic receiver 134. The acoustic transmitter 132 is configured to transmit an acoustic signal that propagates through the source rock 105. The acoustic receiver 134 is configured to receive the acoustic signal after the acoustic signal propagates through the source rock. In embodiments, the acoustic transmitter 132 and the acoustic receiver 134 are communicably coupled to the control system 112 and the control system 112 is configured to compute a compression wave delay time (e.g., representing an amount of time that the acoustic signal generated via the acoustic transmitter 132 propagates in the source rock 105 prior to be emitted and received by the acoustic receiver 134). As described herein, in embodiments, the compression wave delay time may be used to compute an estimated pore pressure at the vertical depth $D_v$ that is updated by a correction factor that is computed based on (i) the TOC estimate generated via the density logging tool 136 and (ii) vitrinite ratio $R_o$ data at the vertical depth $D_v$. The estimated pore pressure and correction factor are described in greater detail herein with respect to FIGS. 1B and 2.

With reference to FIG. 1B, an example embodiment of the control system 112 of the drilling system 100 of FIB 1A is generally configured to control the various components (e.g., the drill string 106, the mud weight system 114) of the drilling system 100 described with respect to FIG. 1A. Further, the control system 112 is configured to compute estimated pore pressures for the source rock 105 in real-time as the well bore 110 is drilled based on measurements taken via the well logging tool 130. As depicted, the control system 112 includes a processor 142, input/output ("I/O") hardware 144, a network interface 146, a communications bus 149, a memory 148, and a database 162.

The control system 112 is communicatively coupled through the communications bus 149, whether in a wired or wireless connection, to the processor 142, input/output ("I/O") hardware 144, network interface 146, memory 148, database 162, a server, a network, and a computing device. The control system 112 may include multiple servers containing one or more applications and computing devices. In some embodiments, the control system 112 is implemented using a wide area network (WAN) or network 322, such as an intranet or the internet. The computing device may include digital systems and other devices permitting connection to and navigation of the network of the control system 112. It is contemplated and within the scope of this disclosure that the computing device may be a personal computer, a laptop device, a smart mobile device such as a smartphone or smart pad, or the like. Other variations of the control system 112 allowing for communication between various geographically diverse components are possible.

The control system 112 may include a display such as a graphical user interface (GUI) on a screen of the computing device for providing visual output such as, for example, information, graphical reports, messages, or a combination thereof. The display on the screen of the computing device is coupled to the communications bus 149 and communicatively coupled to the processor 142. Accordingly, the communications bus 149 communicatively couples the display to other modules of the control system 112. The display can comprise any medium capable of transmitting an optical output such as, for example, a cathode ray tube, light emitting diodes, a liquid crystal display, a plasma display, or the like. Additionally, it is noted that the computing device can comprise the processor 142, the memory 148, or both. While the control system 112 is illustrated as a single, integrated system in FIG. 1B, in other embodiments, the systems can be independent systems.

The communications bus 149 may be a communications path formed from any medium that is capable of transmitting a signal such as, for example, conductive wires, conductive traces, optical waveguides, or the like, or from a combination of mediums capable of transmitting signals. The communications bus 149 communicatively couples the various components of the control system 112. As used herein, the term "communicatively coupled" means that coupled components are capable of exchanging data signals with one another such as, for example, electrical signals via conductive medium, electromagnetic signals via air, optical signals via optical waveguides, and the like.

In the depicted example, the control system 112 also includes the drilling system 100 (or the remaining components of the drilling system 100) described with respect to FIG. 1A. For example, in embodiments, the control system 112 may comprise a computing system connected to the drill string 106 (and thereby the well logging tool 130) and the mud weight system 114. It should be appreciated that embodiments are also envisioned where a computing device that is separate from the drilling system 100 (e.g., receiving information therefrom via a network interface or the like) performs any of the functions described herein with respect to the control system 112.

While the control system 112 is depicted to include a single processor 142, it should be appreciated that the control system 112 may include any number of processors depending on the implementation. The processor 142 can include any suitable processing device, such as a microprocessor, microcontroller, integrated circuit, logic device, a microchip, a computer, and/or other suitable processing device. In embodiments, the processor 142 is a processing circuit (e.g., either a single processing circuit or a group processing circuit) that executes some or all of the machine-readable instructions from multiple modules of one or more non-transitory computer-readable mediums (e.g., the memory 148). The processor 142 can be any device capable of executing machine readable instructions. The processor 142 may be a pore pressure estimation processor as described herein. The processor 142 is communicatively coupled to the other components of the control system 112 by the communications bus 149. Accordingly, the communications bus 149 may communicatively couple any number of processors with one another, and allow the modules coupled to the communications bus 149 to operate in a distributed computing environment. Specifically, each of the modules can operate as a node that may send and/or receive data.

I/O hardware 144 may include one or more elements that receive inputs from a user and/or provide results of the computations performed via the control system 112 to a user. For example, in embodiments, the I/O hardware 144 may include a basic input/output system (BIOS) that interacts with hardware of the control system 112, device drivers that interact with particular devices of the control system 112, one or more operating systems, user applications, background services, background applications, and the like. The network interface 146 can include any suitable components for interfacing with one or more network(s), including for example, transmitters, receivers, ports, controllers, antennas, and/or other suitable components. The network interface 146 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The control system 112 comprises such network interface hardware for communicatively coupling with a computer network, and the network interface hardware is coupled to the communications bus 149 such that the communications bus 149 communicatively couples the network interface hardware to other modules of the control system 112. The network interface hardware can be any device capable of transmitting and/or receiving data via a wireless network. Accordingly, the network interface hardware can comprise a communication transceiver for sending and/or receiving data according to any wireless communication standard.

Data from various applications running on the computing device of the control system 112 can be provided via the network interface hardware. The computing device can be any device having hardware (e.g., chipsets, processors, memory, etc.) for communicatively coupling with the network interface hardware and a network. Specifically, the computing device can comprise an input device having an antenna for communicating over one or more of the wireless computer networks described above.

The network can comprise any wired and/or wireless network such as, for example, wide area networks, metropolitan area networks, the internet, an intranet, satellite networks, or the like. Accordingly, the network can be utilized as a wireless access point by the computing device to access one or more servers, which generally comprise processors, memory, and chipset for delivering resources via the network. Resources can include providing, for example, processing, storage, software, and information from the server to the control system 112 via the network. Additionally, it is noted that the server and any additional servers can share resources with one another over the network such as, for example, via the wired portion of the network, the wireless portion of the network, or combinations thereof.

The database 162 may generally comprise a data storage component communicably coupled to the processor 142 via the communications bus 149. As a non-limiting example, the database 162 may include one or more database servers that support NoSQL, MySQL, Oracle, SQL Server, NewSQL, and/or the like. In embodiments, the drilling system 100 of FIG. 1A may be communicatively coupled to a "big data" environment including the database 162 configured to store and process large volumes of data in such an environment. The database 162 may be, for example, a structured query language (SQL) database or a like database that may be associated with a relational database management system (RDBMS) and/or an object-relational database management system (ORDBMS). The database 162 may be any other large-scale storage and retrieval mechanism whether a SQL, SQL including, or a non-SQL database. For example, the database 162 may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of supporting large amounts of data, whether currently available or yet-to-be developed, and as understood to those of ordinary skill in the art, may be utilized with the tool described herein as well.

The memory 148 is communicatively coupled to the processor 142. As a non-limiting example, the memory 148 may comprise one or more non-transitory computer-readable mediums that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components capable of storing machine readable instructions such that the machine readable instructions can be accessed and executed by the processor 142. Memory 148 may store instructions accessible to the processor 142 via an addressing scheme such that the processor 142 may access the memory 148 to execute the instructions in accordance with a program to perform any of the functions and operations described herein. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 148. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The memory 148 is depicted to include a pore pressure analysis module 150, a mud weight control module 152, a model module 154, and a pore pressure mapping module 160. It should be appreciated that these modules are exemplary only and that the memory 148 may include any number of modules to perform the various functions of the control system 112 described herein and the functions performed by the pore pressure analysis module 150, the mud weight control module 152, the model module 154, and the pore pressure mapping module 160 may be performed by any other module consistent with the present disclosure.

The model module 154 is depicted to include a regional model 156 for a region of source rock (e.g., corresponding to the source rock 105 described herein with respect to FIG. 1A) and a source rock model 158 for source rock of a well bore (e.g., corresponding to a location of the well bore 110 being formed via the drilling system 100 described herein with respect to FIG. 1A). The regional model 156 and the source rock model 158 may include data resulting from modeling analysis conducted of a region of interest (e.g., a region of the well bore 110). For example, in embodiments, the regional model 156 includes regional data associated with the region of the source rock. The regional data may include overburden gradient data (also referable to as OBG data) defining overburden stress of the source rock in the region, a compaction velocity profile of the source rock in the region as a function of effective stress (e.g., generated via densities measured at a plurality of vertical depths within the source rock), and an unloading velocity profile of the source rock as a function of effective stress including pore overpressure (e.g., measured via a seismic survey).

In embodiments, the source rock model 158 of the model module 154 includes vitrinite ratio $R_o$ data for the source rock 105 defining hydrocarbon maturity in the source rock 105. In embodiments, the vitrinite ratio $R_o$ data includes a cutoff value reflective of a differentiation between a first hydrocarbon type in the source rock 105, associated with the vitrinite ratio $R_o$ data being less than the cutoff value, from a second hydrocarbon type in the source rock 105, associated with the vitrinite ratio $R_o$ data being greater than or equal to the cutoff value. In embodiments, the cutoff value is $R_o$=1.1 or in an approximate range of between about 1.0 to about 1.2. In embodiments, the first hydrocarbon type is a volatile oil. In embodiments, the second hydrocarbon type is a gas condensate. In embodiments, the various components of the regional model 156 and the source rock model 158 are generated via previous studies conducted of the regions of the well bore (e.g., collected from a plurality of well bores previously drilled within the region of the well bore 110).

In embodiments, the pore pressure analysis module 150 includes machine-readable instructions that are executable by the processor 142 to cause the processor 142 as the pore pressure estimation processor described herein to estimate a pore pressure of the source rock 105 (e.g., at the vertical depth $D_v$, see FIG. 1A) using the regional model 156 and the source rock model 158 of the model module 154. For example, in embodiments, the machine-readable instructions of the pore pressure analysis module 150 may, when executed by the processor 142, cause the processor 142 to calculate an estimated pore pressure based on an associated overburden gradient data, compaction velocity profile, and unloading velocity profile from the regional model 156.

In embodiments, the pore pressure analysis module 150 may include density and TOC estimation logic that upon execution causes the processor 142 to estimate a density of the source rock 105 at the vertical depth $D_v$ based on the detection signals generated via the detector 140 of the density logging tool 136. Based on the density of the source rock 105 estimated using the density logging tool 136, the density and TOC estimation logic may cause the processor 142 upon logic execution to determine a TOC estimate. In embodiments, the pore pressure analysis module 150 may also include instructions that cause the processor 142 upon execution to access the database 162 and/or the source rock model 158 to determine or identify vitrinite ratio $R_o$ data for the source rock 105 at the vertical depth $D_v$. The instructions may further cause the processor 142 to determine a correction factor for the pore pressure estimated via the regional model 156 based on (i) the TOC estimate and (ii) the vitrinite ratio $R_o$ data at the vertical depth. After computing the correction factor, the processor 142 may update the estimated pore pressure in real-time based on the correction factor.

In embodiments, via the pore pressure analysis module 150, the control system 112 may estimate a pore pressure of the source rock 105 in real time based on measurements taken via the density logging tool 136. In embodiments, via the pore pressure analysis module 150, the control system 112 may initially estimate a pore pressure of the source rock 105 based on a compression wave delay time measured via the well logging tool 130 (e.g., via the acoustic transmitter 132 and the acoustic receiver 134) and the regional model 156 (e.g., through using Bower's Method). The processor 142 may then update the initially estimated pore pressure based on measurements generated via the density logging tool 136. The computations through which the pore pressure of the source rock 105 is calculated and updated are described in greater detail herein with respect to FIGS. 2-6C.

In embodiments, the pore pressure mapping module 160 includes instructions that are executable by the processor 142 to cause the processor 142 upon execution to update an existing pore pressure model of a region (e.g., the region associated with the source rock 105 described herein with respect to FIG. 1A). As a non-limiting example, the processor 142 may be operable to spatially plot a plurality of pore pressure estimates that are updated via the correction factor described herein (e.g., using TOC estimates and vitrinite ratio $R_o$ data at particular locations associated with pore pressure estimates of the existing pore pressure model) to generate an updated pore pressure model having corrected pore pressure values. Such an updated pore pressure model may facilitate formulation of drilling strategies for various resource extraction techniques. A method that may be performed by the processor 142 as an executed logic control scheme to generate such an updated pore pressure model will be described in greater detail herein with respect to FIG. 4.

In embodiments, the mud weight control module 152 includes instructions that are executable by the processor 142 to cause the processor 142 to compare pore pressure estimates to mud weights provided into the well bore 110 and to determine whether the mud weight satisfies a desired predetermined relationship with the pore pressure estimates.

More detail on the relationship between the mud weight and the estimated pore pressure is provided herein with respect to FIG. 3 further below. The instructions of mud weight control module 152 may cause the processor 142 to control the mud weight system 114 (e.g., the pump system 118, the fluid regulator 128, and the mud weight additive system 122). For example, in embodiments, if the mud weight is beneath the estimated pore pressure by more than a predetermined amount, the mud weight control module 152 may cause the processor 142 to generate and provide control signals to the mud weight additive system 122 to dynamically increase the mud weight until greater than or equal to the estimated pore pressure.

Figure 2:
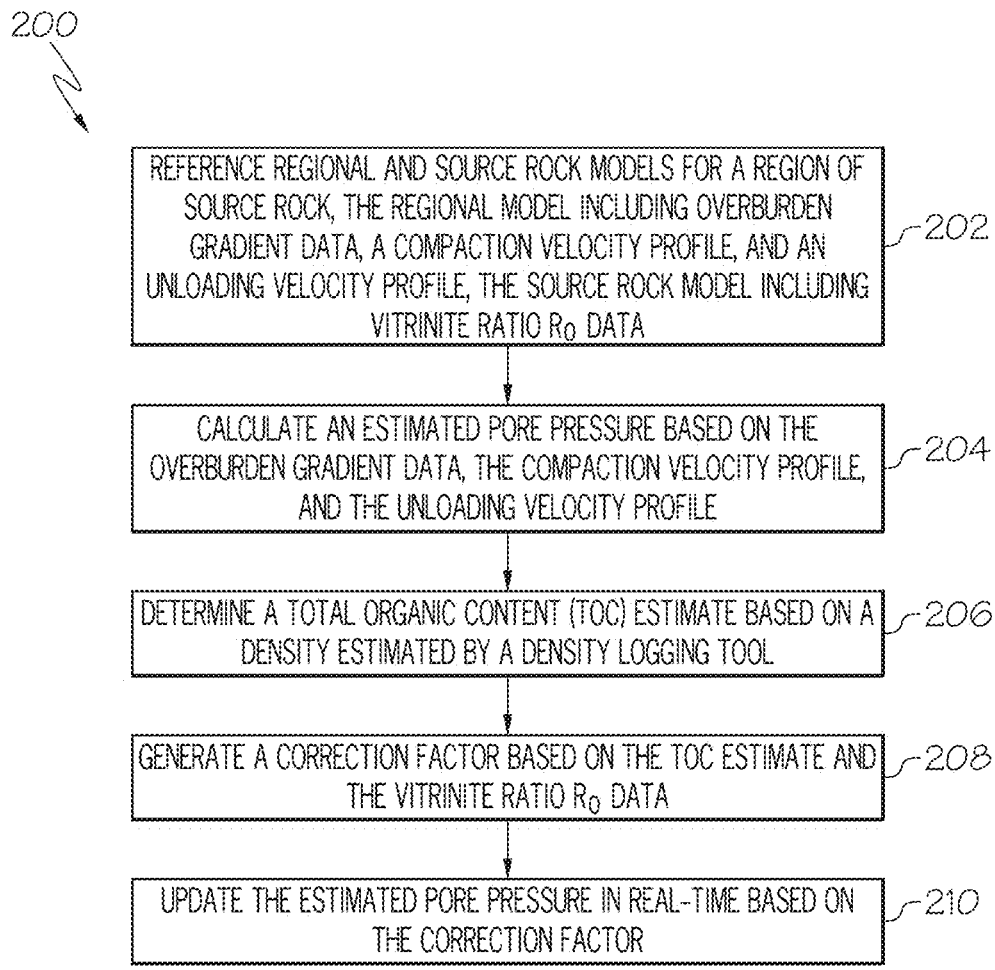
FIG. 2 depicts a flow diagram of a method of updating an estimated pore pressure using a correction factor, according to one or more embodiments shown and described herein.

With reference now to FIG. 2, a flow diagram of a process 200 for estimating a pore pressure is depicted. In embodiments, the processor 142 of the control system 112 is communicably coupled to the density logging tool 136 and the model module 154, and is operable to implement the control scheme of the process 200 of FIG. 2. For example, with reference to FIGS. 1A and 1B, in embodiments, the processor 142 may be operable to perform the process 200 while drilling the well bore 110 to calculate an estimated pore pressure of the source rock 105 at the vertical depth $D_v$ and update the estimated pore pressure using a correction factor based on (i) a TOC estimate determined based on a density at the vertical depth $D_v$ estimated using the density logging tool 136; and (ii) vitrinite ratio $R_o$ data (e.g., associated with the source rock model 158) at the vertical depth $D_v$. Accordingly, reference to various components depicted in FIGS. 1A and 1B will be used to aid in the description of the process 200.

In block 202 the regional and source rock models 156 and 158 are referenced. In embodiments, a user may input data collected for a region of interest (e.g., associated with the source rock 105 of the well bore 110). Such input data may include the regional model 156 and the source rock model 158 of the model module 154 described herein with respect to FIG. 1B. In embodiments, the regional model 156 includes regional data associated with the region of the source rock 105, including the overburden gradient data defining overburden stress of the source rock 105, the compaction velocity profile of the source rock 105 as a function of effective stress, and the unloading velocity profile of the source rock 105. In embodiments, the compaction velocity profile includes a normal compaction trend curve representative of seismic velocity as a function of effective stress, the function calculated as $$Y=Ax^B, \tag{EQUATION 1}$$

where Y is representative of the seismic velocity measurements taken in the region of the source rock 105, x is representative of the effective stress, A is representative of a coefficient of the normal compaction trend curve, and B is an exponent of the normal compaction trend curve. The compaction velocity profile (e.g., the compaction velocity profile 602 described in greater detail below with respect to FIG. 6A) of the regional model 156 may describe seismic velocity as a function of effective stress in accordance with Equation 1, with A being a power law coefficient of the normal compaction trend curve and B being a power law exponent of the normal compaction trend curve. The compaction velocity profile 602 may represent a relationship between seismic velocity within the source rock 105 as a function of depth if overburden stress (e.g., compaction due to the rock overlying the source rock 105 and determined based on the overburden gradient data) was the main source of compaction and pore pressure.

Figure 6A:
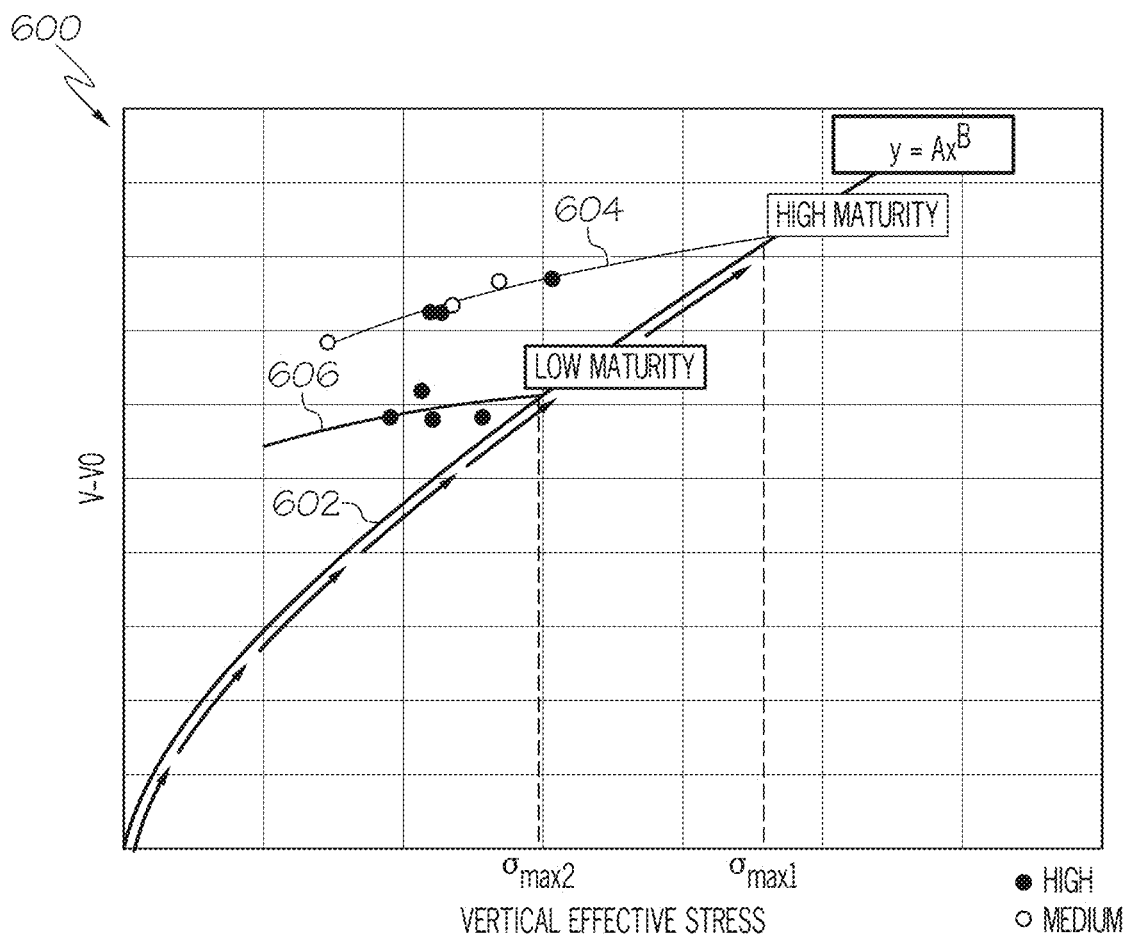
FIG. 6A depicts a graph including a compaction velocity profile and an unloading velocity profile for a region of source rock, according to one or more embodiments described herein.

In embodiments, the unloading velocity profile (e.g., the unloading velocity profile 604 described in greater detail below with respect to FIG. 6A) associated with the regional model 156 includes a maximum effective stress value $\sigma_{max}$ representative of a point of intersection (as shown in FIG. 6A) between the unloading velocity profile 604 and the compaction velocity profile 602 of the regional model 156. In embodiments, the unloading velocity profile 604 also includes an unloading parameter U representative of an exponent of the unloading velocity profile 604 when normalized to the maximum effective stress value $\sigma_{max}$. For example, when fluid is present in the source rock 105, fluid expansion (e.g., due to heating) and/or generation (e.g., associated with hydrocarbon generation) may cause a relationship between seismic velocity and effective stress within the source rock 105 to deviate from the normal compaction trend curve represented by Equation 1. The presence of pressurized fluid may cause the seismic velocity to be greater than the normal compaction trend curve at the same levels of effective stress. Such behavior is referred to herein as "unloading." That is, the unloading velocity profile may define an unloading curve that is related to the normal compaction trend curve by the following relation:

$$\frac{\sigma}{\sigma_{max}} = \left(\frac{\sigma_{nc}}{\sigma_{max}}\right)^U, \quad \text{(EQUATION 2)}$$

where $\sigma_{nc}$ is the effective stress as a function of vertical depth of the normal compaction trend curve defined by Equation 1 herein and U is an unloading parameter.

In block 204, the processor 142 is operable to calculate an estimated pore pressure based on the overburden gradient data, the compaction velocity profile, and the unloading velocity profile of the regional model 156. In embodiments, the estimated pore pressure is calculated based on a relation such as Bower's Method, the relation comprising $$P_{est} = S_v - \sigma_{max}\left[\frac{1}{\sigma_{max}} * \left(\frac{\Delta V}{A}\right)^{\frac{1}{B}}\right]^U, \quad \text{(EQUATION 3)}$$

wherein $S_v$ is representative of the overburden gradient data multiplied by the vertical depth $D_v$ and a velocity difference $\Delta V$ is representative of a difference between a compressional velocity measured by the drilling system 100 and a surface compressional velocity from the regional model 156. In embodiments, the drilling system 100 is configured to determine the compressional velocity used to compute the velocity difference $\Delta V$ in Equation 3 above using the well logging tool 130. For example, the velocity difference $\Delta V$ may be measured in real time at the vertical depth $D_v$ using the compression wave delay time determining using the acoustic transmitter 132 and the acoustic receiver 134.

In block 206, the processor 142 is operable to determine a TOC estimate based on a density estimated via the density logging tool 136. For example, based on the detection signal generated by the detector 140, the processor 142 may determine a TOC estimate by accessing one or more lookup tables or inputting the estimated density into a predetermined TOC estimation function (e.g., associated with the pore pressure analysis module 150).

In block 208, the processor 142 is operable to generate a correction factor for the estimated pore pressure based on the TOC estimate and the vitrinite ratio $R_o$ data at the vertical depth $D_v$. In embodiments, the correction factor is a function of the TOC estimate and the vitrinite $R_o$ data at the vertical depth $D_v$. In embodiments, the correction factor $C_f$ may be expressed as:

$$C_F = f(TOC, Ro). \quad \text{(EQUATION 4)}$$

For example, in embodiments, the regional model 156 includes a plurality of measured pore pressures for the region of the source rock 105. The measured pore pressures may be compared to estimated pore pressures calculated using Equation 3 above (e.g., plotted relative to one another), and the function $f$ may be generated (e.g., via a suitable curve fitting technique) based on a relationship between the estimated pore pressures and the measured pore pressures. As described herein, the actual pore pressures may vary from the estimated pore pressures in accordance with different relationships depending on the vitrinite ratio $R_o$ data associated with the particular location in the region of the measured and estimated pore pressures. Pore pressures estimated via Equation 3 may differ from measured pore pressures in accordance with a first relationship (e.g., as a first function of TOC content) for locations having vitrinite ratio $R_o$ data that is less than a cutoff value (e.g., representing high maturity wells) and a second relationship (e.g., as a second function of TOC content) for locations having vitrinite ratio $R_o$ data that is greater than or equal to the cutoff value (e.g., representing low maturity wells). That is, in embodiments, the function $f$ of Equation 4 may vary depending on the vitrinite ratio $R_o$ data determined at block 208.

In block 210, the processor 142 is operable to update the estimated pore pressure calculated at block 204 in real-time based on the correction factor $C_f$. In embodiments, the correction factor $C_f$ is added to the estimated pore pressure calculated based on the overburden gradient data, the compaction velocity profile 602, and the unloading velocity profile 604 at block 204. Adding the correction factor $C_f$ to Equation 3 aids to avoid an underestimation of the pore pressure computed via Equation 3 herein.

Figure 3:
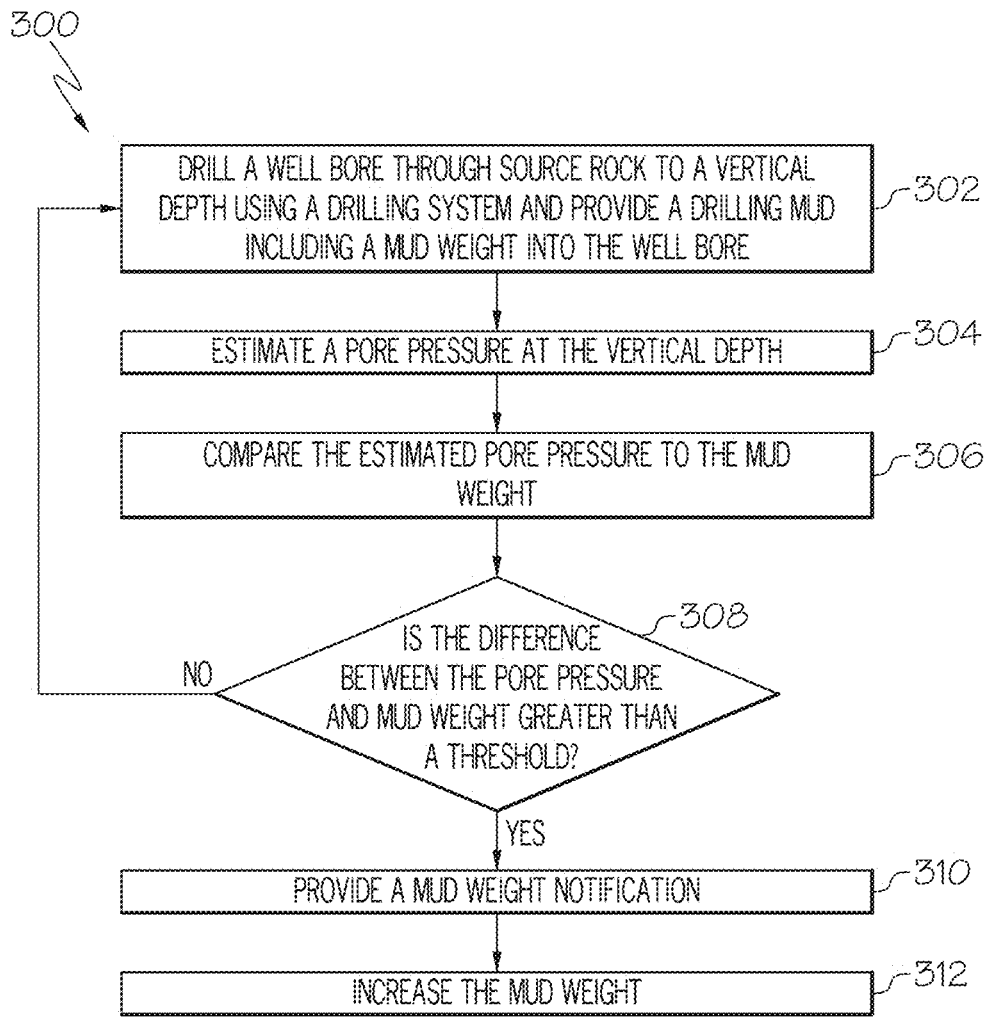
FIG. 3 depicts a flow diagram of a method of changing a mud weight associated with a drilling mud being provided into a well bore based on a pore pressure estimate, according to one or more embodiments shown and described herein.

With reference now to FIG. 3, a flow diagram of a process 300 for changing a mud weight associated with a drilling mud being provided into a well bore based on a pore pressure estimate is depicted. In embodiments, the processor 142 of the control system 112 is communicably coupled to the density logging tool 136, the model module 154, and the mud weight system 114, and is operable to implement the control scheme of the process 300 of FIG. 3. For example, with reference to FIGS. 1A and 1B, in embodiments, the processor 142 may be operable to perform the process 300 while drilling the well bore 110 to dynamically adjust a mud weight of the drilling mud provided to the well bore 110 via the mud weight system 114. Accordingly, reference to various components depicted in FIGS. 1A and 1B will be used to aid in the description of the process 300.

In block 302, the drilling system 100 is operable to carve the well bore 110 through the source rock 105 to the vertical depth $D_v$ and provide drilling mud including a mud weight into the well bore 110. In embodiments, for example, the memory 148 comprises instructions that cause the processor 142 to generate and provide control signals to rotate the drill string 106 and cause the drill bit 108 to form the well bore 110. The instructions may also cause the processor 142 to generate control signals that are provided to the mud weight system 114 (e.g., the pump system 118, the fluid regulator 128) to provide a drilling mud into the well bore 110. In embodiments, the instructions may also cause the processor 142 to generate control signals that are provided to the mud weight additive system 122 to control a concentration of a mud weight additive in the mud weight.

In block 304, the processor 142 is operable to estimate a pore pressure at the vertical depth $D_v$. For example, the pore pressure analysis module 150 may cause the processor 142 to perform the process 200 described herein with respect to FIG. 2 to estimate the pore pressure of the source rock 105 at the vertical depth $D_v$. In blocks 306 and 308, the pore pressure estimated at block 304 is compared to the mud weight and the processor 142 (e.g., via the mud weight control module 152), and the processor 142 is operable to determine whether a predetermined relationship between the mud weight and the estimated pore pressure is satisfied. For example, the processor 142 may determine whether a difference between the pore pressure and the mud weight is greater than a threshold that is dependent on the vertical depth $D_v$. In embodiments, the threshold (and therefore the predetermined relationship) comprises an underbalance expressed by $$MW_d = \frac{P_{est}}{0.052 * V_d}, \quad \text{(EQUATION 5)}$$

where $MW_d$ is representative of a desired mud weight satisfying the underbalance and $P_{est}$ is representative of the estimated pore pressure. If the mud weight in the drilling mud source 116 (e.g., determined by a mud balance or scale) is greater than or equal to $MW_d$, the predetermined relationship is satisfied and the process 300 may revert back to block 302 with the mud weight being unchanged.

If the mud weight in the drilling mud source 116 is less than $MW_d$ in Equation 5 above, the predetermined relationship is not satisfied, indicating the presence of a significant mud weight underbalance. Such a situation poses a risk for a well over-pressurization event. Accordingly, the process 300 may advance to block 310, where the processor 142 may be caused to provide a mud weight notification. In embodiments, the mud weight notification includes an alert provided to a display or sound system associated with the control system 112. In embodiments, the mud weight notification includes a push notification or other network communication transmitted to a separate computing system via the network interface 146. The mud weight notification may alert personnel to add mud weight additives to the drilling mud source 116 to increase the mud weight such that the predetermined relationship is satisfied.

In embodiments, the process 300 includes block 312, where the processor 142 is operable to dynamically increase the mud weight in response to the mud weight not satisfying the predetermined relationship with the estimated pore pressure. For example, in response to the mud weight of the drilling mud disposed in the drilling mud source 116 being beneath the threshold value $MW_d$ computed by Equation 5, the mud weight control module 152 may cause the processor 142 to provide control signals to the mud weight additive system 122 (e.g., a mixing hopper or other suitable delivery mechanism) to increase a concentration of the mud weight additive in the drilling mud until the mud weight is above the threshold value $MW_d$. Via performance of the process 300, the control system 112 is operable control the concentration of the mud weight additive to dynamically update the mud weight in response to the estimated pore pressure and the mud weight notification.

Figure 4:
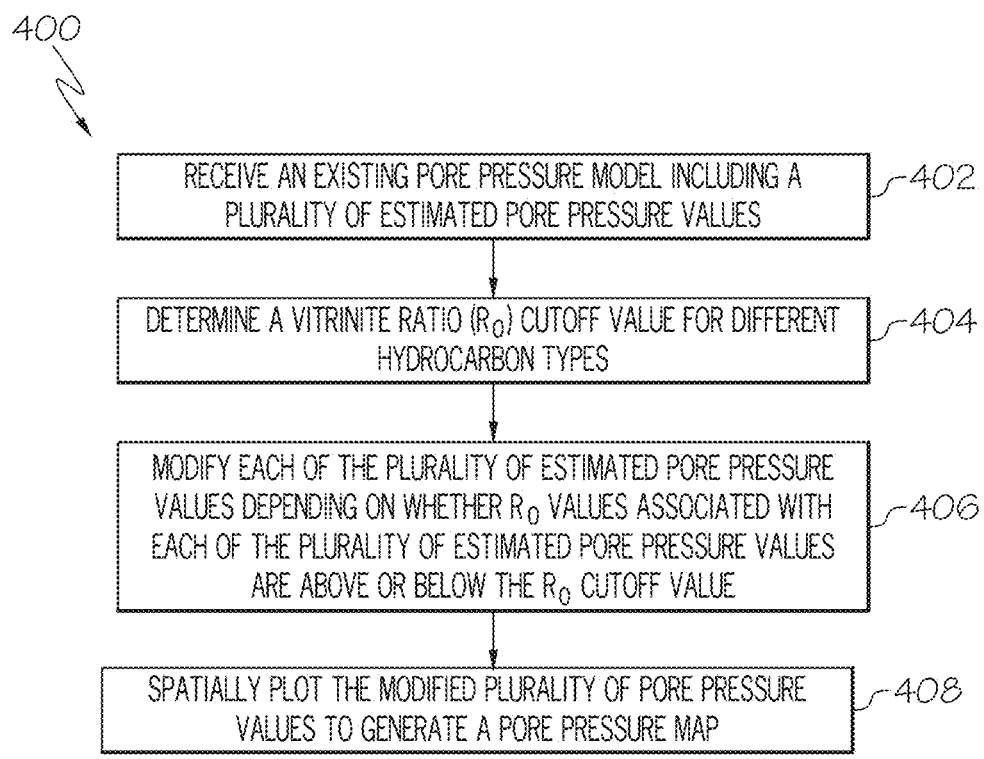
FIG. 4 depicts a flow diagram of a method of generating a pore pressure map, according to one or more embodiments shown and described herein.

With reference now to FIG. 4, a flow diagram of a process 400 for generating a pore pressure map using a plurality of estimated pore pressure values is depicted. In embodiments, the processor 142 of the control system 112 is communicably coupled to the density logging tool 136, and the model module 154 and is operable to implement the control scheme of the process 400 of FIG. 4. For example, with reference to FIGS. 1A and 1B, in embodiments, the processor 142 may be operable to perform the process 400 in order to update an existing pore pressure model of a region of the source rock 105 using a plurality of TOC estimates generated via the density logging tool 136 of the drilling system. Updates to the models and/or maps as described herein may be made in real-time. Accordingly, reference to various components depicted in FIGS. 1A and 1B will be used to aid in the description of the process 400.

In block 402, an existing pore pressure model including a plurality of estimated pore pressure values is received by the control system 112. In embodiments, the plurality of estimated pore pressure values may be computed in accordance with Equation 3 herein. The overburden gradient data, compaction velocity profile 602, and unloading velocity profile 604 of the regional model 156 may be used to calculate the plurality of pore pressure estimates at a plurality of different locations in the region of the source rock 105. Different locations within the region may have different overburden gradient data, compaction velocity profiles 602, and unloading velocity profiles 604 associated therewith. The pore pressure analysis module 150 may cause the processor 142 to compute the plurality of existing pore pressure values using different portions of the regional model 156.

In block 404, the processor 142 may be operable to determine a vitrinite ratio $R_o$ cutoff value for different hydrocarbon types within the region of the source rock 105. In embodiments, as described herein with respect to FIGS. 6A-6C further below, compression wave velocity measurements may vary in accordance with different unloading velocity profiles 604, 606 depending on whether the hydrocarbon maturity at a particular location indicates whether a first type of hydrocarbon or a second type of hydrocarbon is present. The first type of hydrocarbon may be associated with vitrinite ratio $R_o$ data (e.g., of the source rock model 158) being beneath the cutoff value, and the second type of hydrocarbon may be associated with vitrinite ratio $R_o$ data being greater than or equal to the cutoff value. In embodiments, the pore pressure mapping module 160 causes the processor 142 to analyze unloading velocity profiles 604, 606 at a plurality of different locations within the region of source rock 105 and determine how the compaction velocity profiles 602 vary (e.g., in terms of the $\sigma_{max}$ value of Equation 2 herein) depending on the vitrinite ratio $R_o$ data. A value for the vitrinite ratio $R_o$ data that is determined to differentiate between unloading velocity profiles 604, 606 including different respective and associated $\sigma_{max}$ values may be selected as the cutoff value.

In block 406, the processor 142 is operable to modify each of the plurality of estimated pore pressure values depending on whether the vitrinite ratio $R_o$ data associated with each of the plurality of estimated pore pressure values is above or below the cutoff value. In embodiments, the plurality of estimated pore pressure values are modified via addition of the correction factor $C_f$ computed in accordance with Equation 4 herein. To facilitate such modifications to the plurality of estimated pore pressure values, a plurality of density estimates may be generated via the density logging tool 136 (e.g., at a plurality of different well bores) and used to estimate the TOC content at locations associated with the plurality of estimated pore pressure values. The correction factors may be computed as a function of the estimated TOC content. The function $f$ may vary depending on whether the vitrinite ratio $R_o$ data at the particular locations is beneath or greater than or equal to the cutoff value determined at block 404.

In block 408, the processor 142 is operable to spatially plot (e.g., on a display associated with the control system 112, or generate a dataset plotting the modified pore pressure values as a function of location) the modified plurality of pore pressure values to generate a pore pressure map. The pore pressure map may show iso-pressure contours that are colored in accordance with a predetermined coloring scheme to facilitate visualization of pore pressure changes within the region of the source rock 105. An embodiment of such a pore pressure map 700 is described herein in greater detail further below with respect to FIG. 7.

Figure 5:
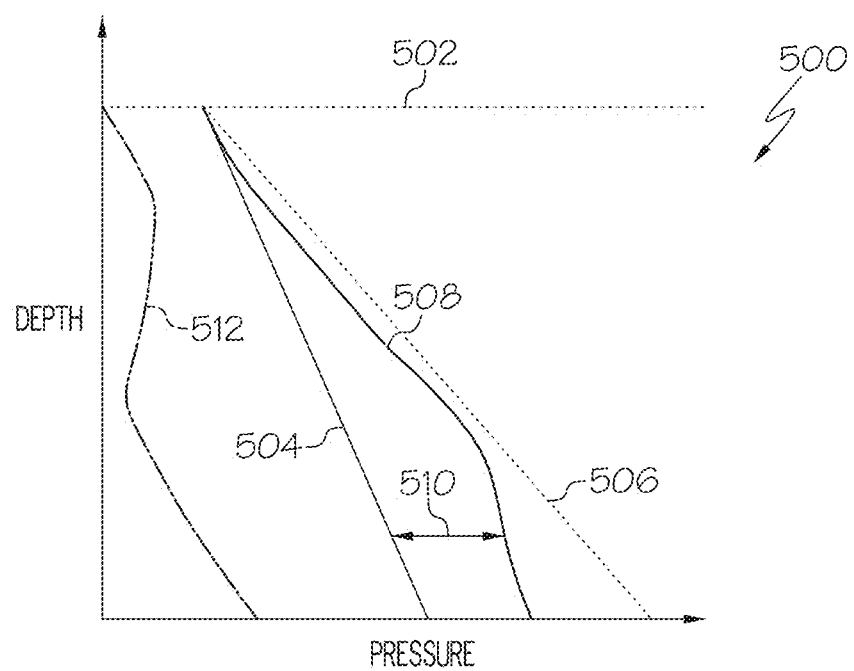
FIG. 5 schematically depicts a graph associated with aspects of a regional model for a region of source rock, according to one or more embodiments shown and described herein.

FIG. 5 depicts a graph 500 representative of various parameters that may be components of a regional model 156 of the source rock 105 described herein with respect to FIGS. 1A and 1B. The graph 500 depicts a surface 502 of a region of source rock (e.g., corresponding to the surface 180 described herein with respect to FIGS. 1A and 1B). The graph 500 includes a hydrostatic pressure curve 504. The hydrostatic pressure curve is representative of a weight of a column of water that increases as a function of the vertical depth $D_v$ from the surface 502. An overburden stress curve 506 is representative of a weight (corresponding to pressure) of rock overlying the source rock 105 that increases depending on the density of the overlying rock as a function of vertical depth $D_v$. The overburden stress curve 506 may be representative of the overburden gradient data of the regional model 156 of the control system 112 described herein with respect to FIGS. 1A and 1B. A pore pressure curve 508 of the graph 500 is representative of a pore pressure within the source rock 105 as a function of depth. A difference 510 between the pore pressure curve 508 and hydrostatic pressure curve 504 represents pore overpressure. An effective stress curve 512 represents a difference between pore pressure and overburden stress.

FIG. 6A depicts a graph 600 of a compaction velocity profile 602 and unloading velocity profiles 604, 606, each associated with an example region of source rock 106. The graph 600 is representative of data that may be contained in the regional model 156 of the control system 112 used to estimate the pore pressure of the source rock 105 described herein. As shown, the compaction velocity profile 602 is indicative of a normal compaction trend curve that may be calculated in accordance with Equation 1 herein. A measured seismic velocity at a particular vertical depth may vary as a function of effective stress within the source rock 105 in accordance with the compaction velocity profile 602 having a power law coefficient A and a power law exponent B.

The unloading velocity profiles 604, 606 include a first unloading velocity profile 604 and a second unloading velocity profile 606. As depicted on the first and second unloading velocity profiles 604 and 606, the measured seismic velocities deviate from the compaction velocity profile 602 due to the presence of pore overpressure mechanisms (e.g., hydrocarbon generation, fluid expansion, etc.) within the source rock 105. Seismic velocity measurements of FIG. 6A are exhibited to behave on either first unloading velocity profile 604 or the second unloading velocity profile 606 depending on the hydrocarbon maturity at the particular locations associated with the seismic velocity measurements. If the vitrinite ratio $R_o$ data at a location associated with a particular seismic velocity measurement is beneath a cutoff value (indicating the presence of gas condensate as a first type of hydrocarbon), the seismic velocity measurements vary as a function of depth in accordance with the first unloading velocity profile 604. If the vitrinite ratio $R_o$ data at a location associated with a particular seismic velocity measurement is greater than or equal to a cutoff value (indicating the presence of volatile oil as a second type of hydrocarbon), the seismic velocity measurements vary as a function of depth in accordance with the second unloading velocity profile 606. In FIG. 6A, the cutoff for the vitrinite ratio $R_o$ data determined to differentiate between the first and second unloading velocity profiles 604 and 606 is a cutoff vitrinite ratio $R_o$ of 1.1. The plot 600 is representative of an analysis performed by the processor 142 during the block 404 of the process 400 described herein with respect to FIG. 4.

Figure 6B:
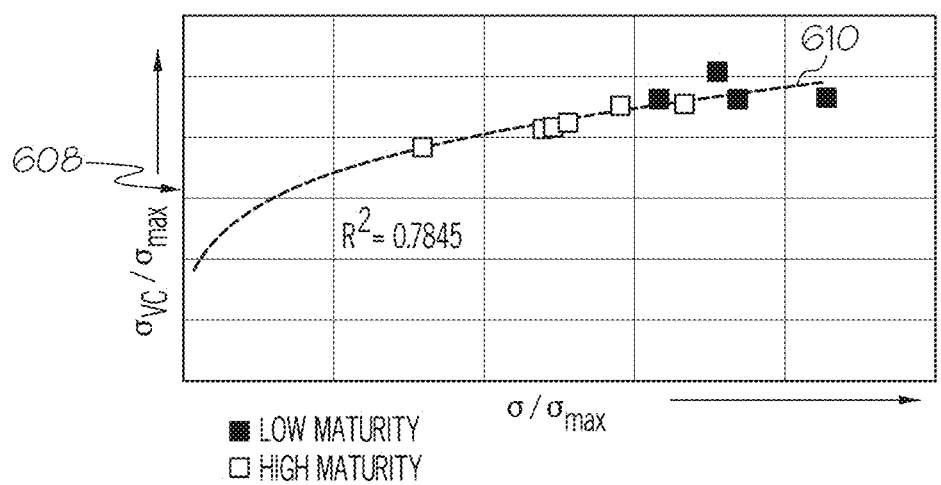
FIG. 6B depicts a graph of an unloading parameter for the region of source rock associated with the compaction and unloading velocity profile depicted in FIG. 6A, according to one or more embodiments shown and described herein.

As depicted in FIG. 6A, both the first and second unloading velocity profiles 604 and 606 intersect the compaction velocity profile 602. The first unloading velocity profile 604 intersects the compaction velocity profile 602 at a first maximum effective stress $\sigma_{max1}$, indicative of a high hydrocarbon maturity intersection point. The second unloading velocity profile 606 intersects the compaction velocity profile 602 at a second maximum effective stress $\sigma_{max2}$, indicative of a low hydrocarbon maturity intersection point FIG. 6B depicts a plot 608 including a normalized unloading profile 610. Data points along the first unloading velocity profile 604 are shown as normalized to the first maximum effective stress $\sigma_{max1}$, and data points along the second unloading velocity profile 606 are shown as normalized to the second maximum effective stress $\sigma_{max2}$. The normalized unloading profile 610 of FIG. 6B follows Equation 2 herein in accordance with a single unloading parameter U.

Accordingly, with reference to FIGS. 1A and 1B, in embodiments in which the regional model 156 includes multiple unloading velocity profiles 604, 606, such as in the plot 600, different respective maximum effective stress values (e.g., $\sigma_{max1}$, $\sigma_{max2}$) may be input to Equation 3 to compute estimated pore pressures, which estimated pore pressure may then be updated via respective correction factors as described herein using Equation 4. For example, when vitrinite ratio $R_o$ data at the vertical depth $D_v$ (e.g., from the source rock model 158) indicates that the vertical depth $D_v$ is associated with a first unloading velocity profile 604, the estimated pore pressure may be calculated based on the following relation:

$$P_{est} = S_v - \sigma_{max,1}\left[\frac{1}{\sigma_{max,1}} * \left(\frac{\Delta V}{A}\right)^{\frac{1}{B}}\right]^{U}. \quad \text{(EQUATION 6)}$$

When the vitrinite ratio $R_o$ data at the vertical depth $D_v$ (e.g., from the source rock model 158) indicates that the vertical depth $D_v$ is associated with a second unloading velocity profile 606, the estimated pore pressure is calculated based on the following relation:

$$P_{est} = S_v - \sigma_{max,2}\left[\frac{1}{\sigma_{max,2}} * \left(\frac{\Delta V}{A}\right)^{\frac{1}{B}}\right]^{U}. \quad \text{(EQUATION 7)}$$

The initial pore pressure that is updated via the correction factor described herein may thus be calculated differently depending on the vitrinite ratio data $R_o$ associated with the vertical depth $D_v$ to improve accuracy of the associated initial pore pressure estimates.

Figure 6C:
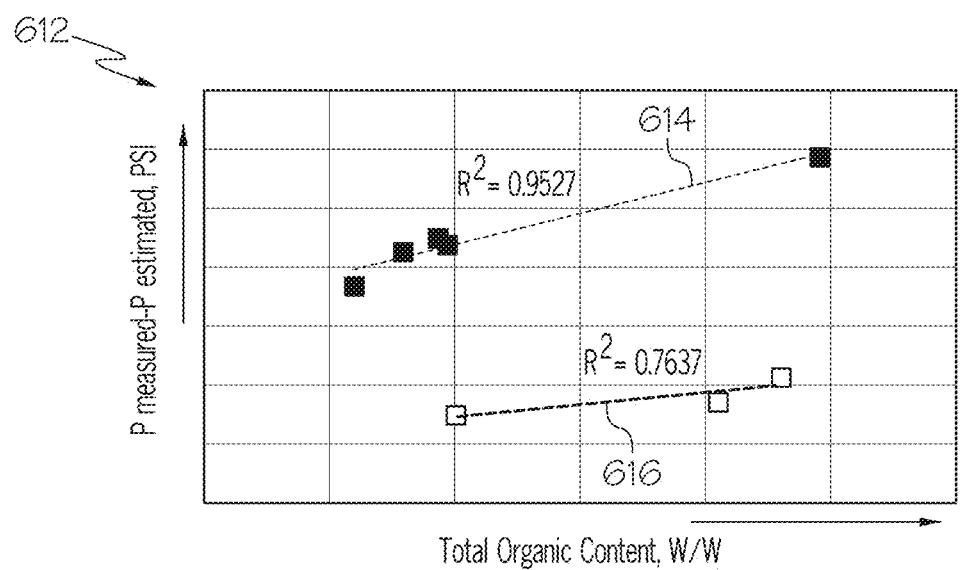
FIG. 6C depicts a plot of error of a pore pressure estimated from the compaction and unloading velocity profiles of FIG. 6A as a function of total organic content, according to one or more embodiments shown and described herein.

FIG. 6C depicts a plot 612 of the results of an analysis conducted for a plurality of pore pressure estimates calculated using Equations 6 and 7 herein for the example region described herein with respect to FIGS. 6A and 6B. After the pore pressures are estimated, a plurality of pore pressure measurements are measured at locations in the regions corresponding to the pore pressure estimates. Differences between the estimated pore pressures generated via Equations 6 and 7 and the measured pore pressures are plotted as a function of TOC at the locations. As shown, the differences follow different curves depending on whether the pore pressures are estimated using the first unloading velocity profile 604 or the second unloading velocity profile 606. The pore pressures estimated via Equation 6 and associated with a high hydrocarbon maturity on the first unloading velocity profile 604 follow a first curve 614 indicative of a measured and estimated pressure difference as function of TOC. The pore pressures estimated via Equation 7 and associated with a low hydrocarbon maturity on the second unloading velocity profile 606 follow a second curve 616 indicative of a measured and estimated pressure difference as a function of TOC. The first and second curves 614 and 616 may represent different functions $f$ in Equation 4 that may be used to correct estimated pore pressures as described herein. The extent to which the pore pressure estimates are modified as a function of TOC may vary depending on the respective vitrinite ratio data $R_o$ associated with the location of each pore pressure estimate.

Figure 7:
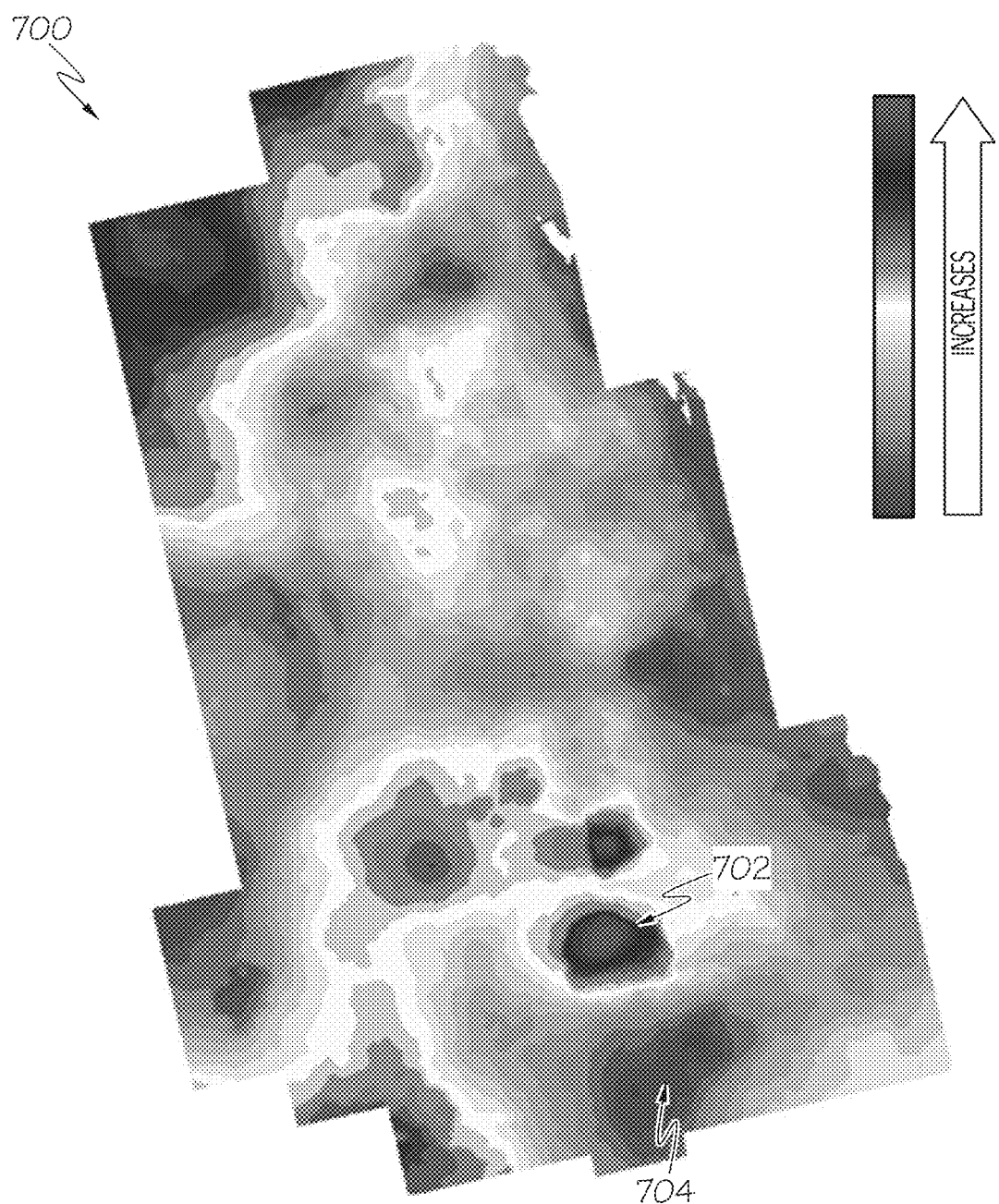
FIG. 7 depicts a pore pressure map generated via performance of the method of FIG. 4, according to one or more embodiments shown and described herein.

FIG. 7 depicts an example pore pressure map 700 that may be generated via performance of the process 400 described herein with respect to FIG. 4. As shown, the pore pressure map 700 facilitates identification of local maximums 702 and local minimums 704 of pore pressure. Pore pressure has a direct relationship with closure stress and/or horizontal minimum stress. Accordingly, the pore pressure map 700 may be used to identify regions of horizontal minimum stress for determining drill strategies.

As described herein, pore pressures estimated (e.g., calculated using Equation 3 herein) using a compaction velocity profile 602 and one or more unloading velocity profiles 604, 606 may underestimate pore pressure of source rock. Such estimates may fail to take hydrocarbon generation within the source rock 105 into account. Accordingly, the systems and methods described herein add a correction factor to the estimated pore pressures from Equation 3, which correction factor varies as a function of TOC and hydrocarbon maturity of the source rock 105. Thus, the functions used to compute the correction factor (e.g., in accordance with Equation 4 herein) may vary depending on vitrinite ratio $R_o$ data associated with the vertical depth of the pore pressure estimate. The functions may be configured to compensate for errors associated with previously computed pore pressure estimates in the region of the source rock 105 in order to compensate for errors in a manner that is particularly tailored to the region. The increased accuracy of the pore pressure estimates computed via the methods described herein may facilitate improved control over mud weights during drilling and improved drilling strategies.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" or "operable" in a particular way, to embody a particular property, or to function in a particular manner, are structural recitations, as opposed to recitations of intended use. More specifically, the references herein to the manner in which a component is "configured", "programmed," or "operable" denotes an existing physical condition of the component and, as such, is to be taken as a definite recitation of the structural characteristics of the component.

For the purposes of describing and defining the present disclosure it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A pore pressure estimation system comprising:
a density logging tool configured to measure a bulk density of source rock at a vertical depth, wherein the density logging tool comprises a gamma ray source transmitting gamma rays into the source rocks-, and a detector configured to generate a density detection signal from a portion of the gamma rays that are scattered by the source rock, wherein a pore pressure estimation processor is operable to determine a total organic content (TOC) estimate of the source rock based on density detection signals;
a model module comprising a regional model for a region of source rock and a source rock model for source rock of a well bore, the source rock model of the model module comprising vitrinite ratio $R_o$ data for the source rock defining hydrocarbon maturity in the source rock, the regional model of the model module comprising regional data associated with the region of the source rock, the regional data comprising overburden gradient data defining overburden stress of the source rock in the region, a compaction velocity profile of the source rock in the region as a function of effective stress, and an unloading velocity profile of the source rock as a function of effective stress including pore overpressure and hydrocarbon maturity;

the pore pressure estimation processor communicably coupled to the density logging tool and the model module, and being operable to calculate an estimated pore pressure based on the overburden gradient data, the compaction velocity profile, the hydrocarbon maturity, and the unloading velocity profile, determine the TOC estimate of the source rock based on the bulk density at the vertical depth using the density logging tool, determine a correction factor based on (i) the TOC estimate and (ii) the vitrinite ratio $R_o$ data, and update the estimated pore pressure in real-time based on the correction factor.

2. The pore pressure estimation system of claim 1, wherein the compaction velocity profile comprises a normal compaction trend curve representative of seismic velocity as a function of effective stress, the function calculated as $$Y=Ax^B,$$

wherein Y is representative of the seismic velocity, x is representative of the effective stress, A is representative of a coefficient of the normal compaction trend curve, and B is an exponent of the normal compaction trend curve.

3. The pore pressure estimation system of claim 1, wherein the unloading velocity profile comprises:
a maximum effective stress value $\sigma_{max}$ representative of a point of intersection between the unloading velocity profile and the compaction velocity profile; and
an unloading parameter U representative of an exponent of the unloading velocity profile when normalized to the maximum effective stress value $\sigma_{max}$.

4. The pore pressure estimation system of claim 1, wherein:
the estimated pore pressure is calculated based on a relation, the relation comprising $$P_{est} = S_v - \sigma_{max}\left[\frac{1}{\sigma_{max}} * \left(\frac{\Delta V}{A}\right)^{\frac{1}{B}}\right]^U,$$

wherein $S_v$ is representative of the overburden gradient data multiplied by the vertical depth and a velocity difference $\Delta V$ is representative of a difference between a compressional velocity measured by the system and a surface compressional velocity from the regional data A is representative of a coefficient of a normal compaction trend curve associated with the compaction velocity profile, B is an exponent of the normal compaction trend curve, U is an unloading parameter representative of an exponent of the unloading velocity profile, and $\sigma_{max}$ is a maximum effective stress representative of a point of intersection between the unloading velocity profile and the compaction velocity profile; and
the velocity difference $\Delta V$ is measured in real time at the vertical depth by the system.

5. The pore pressure estimation system of claim 1, wherein the unloading velocity profile comprises: a first unloading velocity profile associated with a high maturity hydrocarbon, the first unloading velocity profile comprising a first maximum effective stress value $a_{max,1}$ representative of a first point of intersection between the first unloading velocity profile and the compaction velocity profile; and a second unloading velocity profile associated with a low maturity hydrocarbon, the second unloading velocity profile comprising a second maximum effective stress value $a_{max,2}$ representative of a second point of intersection between the second unloading velocity profile and the compaction velocity profile.

6. The pore pressure estimation system of claim 5, wherein, when the vitrinite ratio $R_o$ data indicates that the vertical depth is associated with the first unloading velocity profile associated with the high maturity hydrocarbon, the estimated pore pressure is calculated based on a relation, the relation comprising $$P_{est} = S_v - \sigma_{max,1}\left[\frac{1}{\sigma_{max,1}} * \left(\frac{\Delta V}{A}\right)^{\frac{1}{B}}\right]^U,$$

where $S_v$ is representative of the overburden gradient data multiplied by the vertical depth and a velocity difference $\Delta V$ is representative of a difference between a compressional velocity measured by the system and a surface compressional velocity from the regional data; and
when the vitrinite ratio $R_o$ data indicates that the vertical depth is associated with the second unloading velocity profile associated with the low maturity hydrocarbon, the estimated pore pressure is calculated based on a relation, the relation comprising $$P_{est} = S_v - \sigma_{max,2}\left[\frac{1}{\sigma_{max,2}} * \left(\frac{\Delta V}{A}\right)^{\frac{1}{B}}\right]^U.$$

7. The pore pressure estimation system of claim 6, wherein the correction factor is determined based on whether the vitrinite ratio $R_o$ data at the vertical depth indicates that the vertical depth is associated with the first unloading velocity profile or the second unloading velocity profile.

8. The pore pressure estimation system of claim 1, wherein the correction factor is added to the estimated pore pressure calculated based on the overburden gradient data, the compaction velocity profile, the hydrocarbon maturity, and the unloading velocity profile, and the correction factor is a function of the TOC estimate, and the TOC estimate is a function of the vitrinite $R_o$ data.

9. The pore pressure estimation system of claim 8, wherein:
the vitrinite ratio $R_o$ data for the source rock defining the hydrocarbon maturity in the source rock comprises a cutoff value, the cutoff value reflective of a differentiation between a first hydrocarbon type in the source rock, associated with the vitrinite ratio $R_o$ data being less than the cutoff value, from a second hydrocarbon type in the source rock, associated with the vitrinite ratio $R_o$ data being greater than or equal to the cutoff value;
the correction factor comprises a first function of the TOC estimate when the vitrinite ratio $R_o$ data for the source rock at the vertical depth is beneath the cutoff value; and
the correction factor comprises a second function of the TOC estimate when the vitrinite ratio data for the source rock if the vitrinite ratio $R_o$ data for the source rock at the vertical depth is greater than or equal to the cutoff value.

10. The pore pressure estimation system of claim 1, further comprising an acoustic transmitter and an acoustic receiver, wherein:
the acoustic transmitter is configured to transmit an acoustic signal that propagates through the source rock;
the acoustic receiver is configured to receive the acoustic signal after the acoustic signal propagates through the source rock;
the pore pressure estimation processor is communicably coupled to the acoustic transmitter and to the acoustic receiver to compute a compression wave delay time;
the estimated pore pressure is based on the compression wave delay time; and
the density logging tool, the acoustic transmitter, and the acoustic receiver are disposed in the well bore.

11. The pore pressure estimation system of claim 1, the system further comprising a drill string and a drill bit, wherein:
the drill bit is disposed at an end of the drill string;
the drill bit is configured to carve the well bore through the source rock; and
the vertical depth at which the estimated pore pressure is estimated corresponds to the end of the drill string aligned with the source rock in the well bore.

12. The pore pressure estimation system of claim 11, further comprising a mud weight system fluidly coupled to the drill string, wherein:
the mud weight system is configured to deliver a drilling mud having a mud weight into the well bore;
the mud weight of the drilling mud is based on the estimated pore pressure;
the mud weight system comprises a mud weight additive configured to change the mud weight based on a concentration of the mud weight additive in the mud weight; and
the pore pressure estimation processor is operable to compare the estimated pore pressure to the mud weight to determine whether the concentration of the mud weight additive satisfies a predetermined relationship when the mud weight is less than or equal to the estimated pore pressure.

13. The pore pressure estimation system of claim 12, wherein in response to determining that the mud weight is less than the estimated pore pressure and that the predetermined relationship is not satisfied, the pore pressure estimation processor is configured to:
provide a mud weight notification;
control the concentration of the mud weight additive to dynamically update the mud weight in response to the estimated pore pressure and the mud weight notification; or
both.

14. A pore pressure estimation system comprising:
a density logging tool disposed in a well bore and is configured to measure a bulk density of source rock at a vertical depth, wherein the density logging tool comprises a gamma ray source transmitting gamma rays into the source rocks-, and a detector configured to generate a density detection signal from a portion of the gamma rays that are scattered by the source rock, wherein a pore pressure estimation processor is operable to determine a total organic content (TOC) estimate of the source rock based on density detection signals;

a model module comprising a regional model for a region of source rock and a source rock model for source rock of a well bore, the source rock model of the model module comprising vitrinite ratio $R_o$ data for the source rock defining hydrocarbon maturity in the source rock, the regional model of the model module comprising regional data associated with the region of the source rock, the regional data comprising overburden gradient data defining overburden stress of the source rock in the region, a compaction velocity profile of the source rock in the region as a function of effective stress, and an unloading velocity profile of the source rock as a function of effective stress including pore overpressure and hydrocarbon maturity; and
the pore pressure estimation processor communicably coupled to the density logging tool and the model module, being operable to calculate an estimated pore pressure based on the overburden gradient data, the compaction velocity profile, the hydrocarbon maturity and the unloading velocity profile, determine the TOC estimate of the source rock based on the bulk density at the vertical depth using the density logging tool, determine a correction factor based on (i) the TOC estimate and (ii) the vitrinite ratio $R_o$ data, and update the estimated pore pressure in real-time based on the correction factor such that the correction factor is added to the estimated pore pressure calculated based on the overburden gradient data, the compaction velocity profile, the hydrocarbon maturity, and the unloading velocity profile.

15. The pore pressure estimation system of claim 14, wherein the compaction velocity profile comprises a normal compaction trend curve representative of seismic velocity as a function of effective stress, the function calculated as $$Y=Ax^B,$$

wherein Y is representative of the seismic velocity, x is representative of the effective stress, A is representative of a coefficient of the normal compaction trend curve, and B is an exponent of the normal compaction trend curve.

16. The pore pressure estimation system of claim 14, wherein the unloading velocity profile comprises:
a maximum effective stress value $\sigma_{max}$ representative of a point of intersection between the unloading velocity profile and the compaction velocity profile; and
an unloading parameter U representative of an exponent of the unloading velocity profile when normalized to the maximum effective stress value $\sigma_{max}$.

17. The pore pressure estimation system of claim 14, wherein the unloading velocity profile comprises: a first unloading velocity profile associated with a high maturity hydrocarbon, the first unloading velocity profile comprising a first maximum effective stress value $a_{max,1}$ representative of a first point of intersection between the first unloading velocity profile and the compaction velocity profile; and a second unloading velocity profile associated with a low maturity hydrocarbon, the second unloading velocity profile comprising a second maximum effective stress value $a_{max,2}$ representative of a second point of intersection between the second unloading velocity profile and the compaction velocity profile.

18. The pore pressure estimation system of claim 17, wherein the correction factor is determined based on whether the vitrinite ratio $R_o$ data indicates that the vertical depth is associated with the first unloading velocity profile associated with the high maturity hydrocarbon or the second unloading velocity profile associated with the low maturity hydrocarbon.

19. A method comprising:
- calculating, via a pore pressure estimation processor, an estimated pore pressure based on regional data of a regional model for a region of source rock of a well bore, the regional data of the regional model comprising overburden gradient data defining overburden stress of the source rock in the region, a compaction velocity profile of the source rock in the region as a function of effective stress, and an unloading velocity profile of the source rock as a function of effective stress and hydrocarbon maturity;
- determining a total organic content (TOC) estimate of the source rock based on a bulk density at a vertical depth, wherein the bulk density at the vertical depth is estimated using a density logging tool that is configured to estimate the bulk density at the vertical depth, wherein the density logging tool comprises a gamma ray source transmitting gamma rays into the source rock, and a detector configured to generate a density detection signal from a portion of the gamma rays that are scattered by the source rock, wherein the pore pressure estimation processor is operable to determine the TOC estimate of the source rock based on density detection signals;
- determining a correction factor based on (i) the TOC estimate and (ii) vitrinite ratio $R_0$ data for the source rock defining hydrocarbon maturity in the source rock; and
- updating, via the pore pressure estimation processor, the estimated pore pressure in real-time based on the correction factor.

* * * * *